United States Patent
Ishiguro

[19]

[11] Patent Number: 5,959,248
[45] Date of Patent: Sep. 28, 1999

[54] ELECTRICAL JUNCTION BOX

[75] Inventor: Masaaki Ishiguro, Hokkaido, Japan

[73] Assignee: Yazaki Corporation, Tokyo, Japan

[21] Appl. No.: 09/003,884

[22] Filed: Jan. 7, 1998

[30] Foreign Application Priority Data

Jan. 7, 1997 [JP] Japan ................................. 9-000813

[51] Int. Cl.$^6$ ............................................. H01H 9/02
[52] U.S. Cl. ................... 174/53; 361/736; 439/364
[58] Field of Search ......................... 174/53; 439/76.2,
439/949, 364; 361/641–658, 736, 752

[56] References Cited

U.S. PATENT DOCUMENTS

| | | | |
|---|---|---|---|
| 3,610,811 | 10/1971 | James | 174/262 |
| 4,402,563 | 9/1983 | Sinclair | 439/264 |
| 5,167,512 | 12/1992 | Walkup | 439/66 |
| 5,207,587 | 5/1993 | Hamill et al. | 439/76.2 |
| 5,378,173 | 1/1995 | Hashizawa | 439/701 |
| 5,877,944 | 3/1999 | Onizuka | 361/826 |

*Primary Examiner*—Kristine Kincaid
*Assistant Examiner*—Dhiru R Patel
*Attorney, Agent, or Firm*—Morgan, Lewis & Bockius LLP

[57] ABSTRACT

In an electrical junction box, a female connector is provided in an upper cover adapted to cover the upper surface of a circuit board having a plurality of bus bars, a male connector engaging with the female connector is fixed with a bolt, a nut engaged with the bolt is supported by a nut support in the female connector, a cylindrical hollow is formed in the nut support, and a scraping-scattering preventing section which is fitted in the cylindrical hollow is formed on the circuit board. Hence, even if the bolt or the nut forms metal scrapings when the former is engaged with the latter, the scrapings are accommodated in the receiving pan of the scraping-scattering preventing section; that is, they are prevented from dropping on the circuit board.

3 Claims, 6 Drawing Sheets

ELECTRICAL JUNCTION BOX

BACKGROUND OF THE INVENTION

1. Field of the Invention

This invention relates to an electrical junction box in which connectors are to be mounted which are used for connection of wire harnesses, and more particularly to an improvement of an electrical junction box which has a bolt-tightened multi-pole connector on a cover accommodating a circuit board.

2. Description of the Related Art

A conventional electrical junction box having a bolt-tightened multi-pole connector on a cover accommodating a circuit board will be described with reference to FIGS. 6 and 7.

In FIGS. 6 and 7, reference numeral 31 designates the conventional electrical junction box which comprises an upper cover 34, a lower cover (not shown), and a circuit board 33 interposed between those covers. The circuit board 33 is made up of an electrical insulating material, and has a plurality of bus bars 32 at suitable positions. The upper cover 34 includes a connector inserting section 35, which has an opening 37 surrounded by a frame 36. In the opening 37, a plurality of male terminals 38 are protruded.

A male multi-pole connector 39 is detachably inserted into the opening 37 of the connector inserting section 35. The male multi-pole connector 39 accommodates a plurality of female terminals which are connected to the ends of wires (not shown). A nut support 40 is provided at the center of the opening 37 of the connector inserting section 35, to support a nut 41. On the other hand, a receiver 42 adapted to receive the nut support 40 is provided at the center of the multi-pole connector 39, to support a bolt 43 which is to be engaged with the nut 41.

As was described above, the conventional electrical junction box 31 comprises the upper cover 34, the lower cover (not shown), and the circuit board 33 interposed between those covers. The male multi-pole connector 39 is fitted in the connector inserting section 35 formed in the upper cover 34. The bolt 43 in the male multi-pole connector 39 is engaged with the nut 41 in the nut support 40, so that the multi-pole connector 39 is fixedly secured to the electrical junction box 31.

When, in the conventional electrical junction box 31, the multi-pole connector 39 is fitted in the connector inserting section 35, the bolt 43 is threadably engaged with the nut 41. Hence, in this operation, part of the nut or bolt may be removed to form metal particles (hereinafter referred to as "scrapings", when applicable) 44 although the amount of the scrapings is considerably small. The scrapings may drop on the circuit board 33 for instance when the electrical junction box is vibrated. The scrapings thus dropped may bridge the bus bars 32 on the circuit board 33, thus short-circuiting the bus bars 32.

The above-described difficulty may be eliminated by employing the following method: No bus bars are arranged on the central area of the circuit board which includes the areas right below the bolt 43, and the bus bars are arranged at sufficiently large intervals. However, this method results in an increase in area of the circuit board, and accordingly an increase in volume of the electrical junction box.

Furthermore, in the conventional electrical junction box 31, the circuit board 33 between the upper cover 34 and the lower cover may be oscillated sidewardly.

SUMMARY OF THE INVENTION

In view of the foregoing, an object of this invention is to provide an electrical junction box in which scrapings, which may be formed when the bolt and the nut are threadably engaged with or disengaged from each other, are prevented from dropping on the circuit board, and the oscillation of the circuit board is positively prevented.

In order to achieve the above object, the invention provides an electrical junction box comprising: a circuit board having a plurality of bus bars; an upper cover which covers one surface of the circuit board; a lower cover which covers the other surface of the circuit board; a first connector which has a connector inserting section and is provided on the upper cover at a suitable position; a nut support which supports a nut and is provided in the center of the first connector, so that a second connector, which is a mating connector, is fixedly fitted in the first connector with a bolt; and a scraping-scattering preventing section provided on the circuit board, the scraping-scattering preventing section being inserted into a cylindrical hollow formed below the nut support and being adapted to receive scrapings which may fall from the bolt or nut.

DETAILED DESCRIPTION OF THE PREFERRED EMBODIMENTS

Preferred embodiments of the invention will be described with reference to the accompanying drawings.

Figure 1:
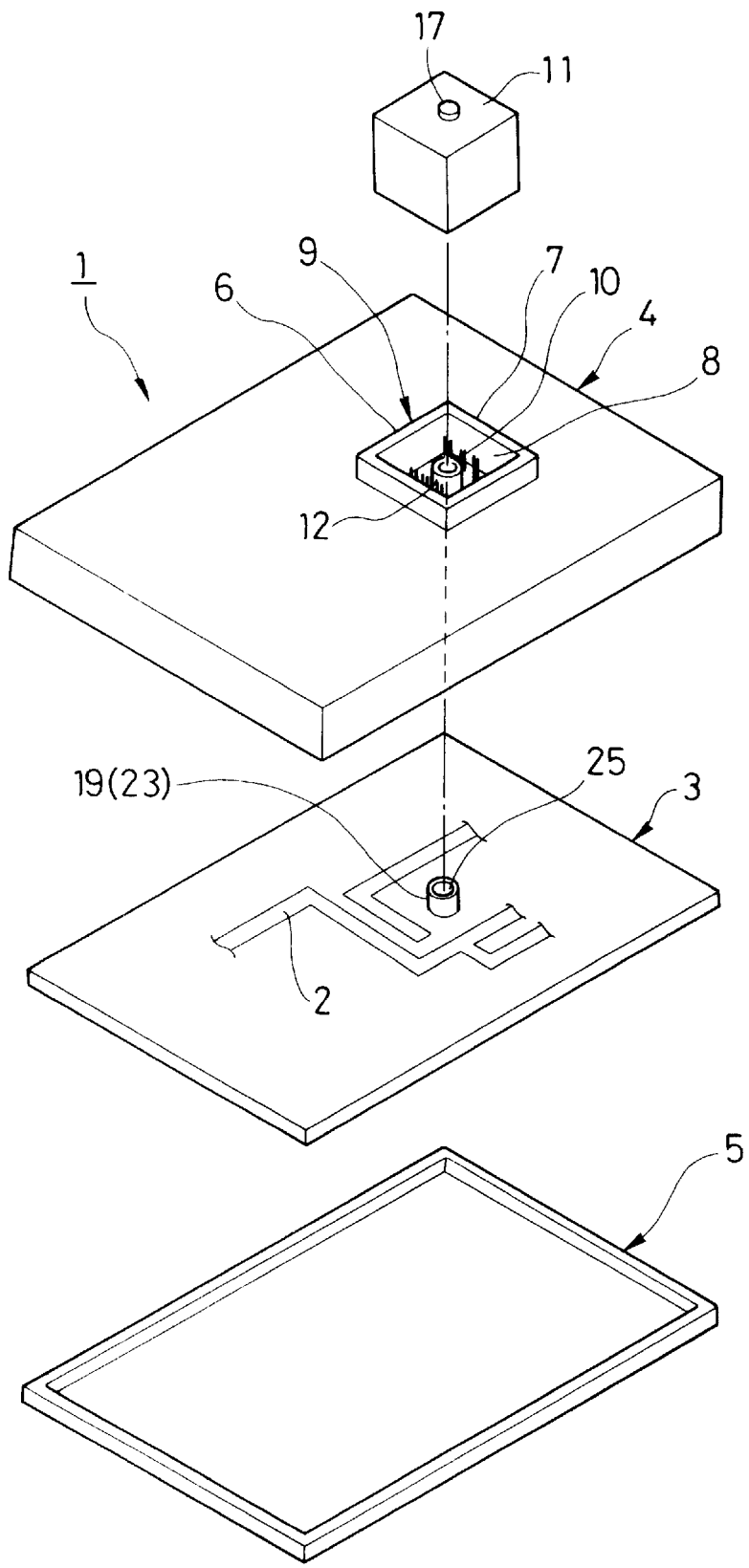
FIG. 1 an exploded perspective view showing essential components of an example of an electrical junction box, which constitutes a first embodiment of the invention.
Figure 2:
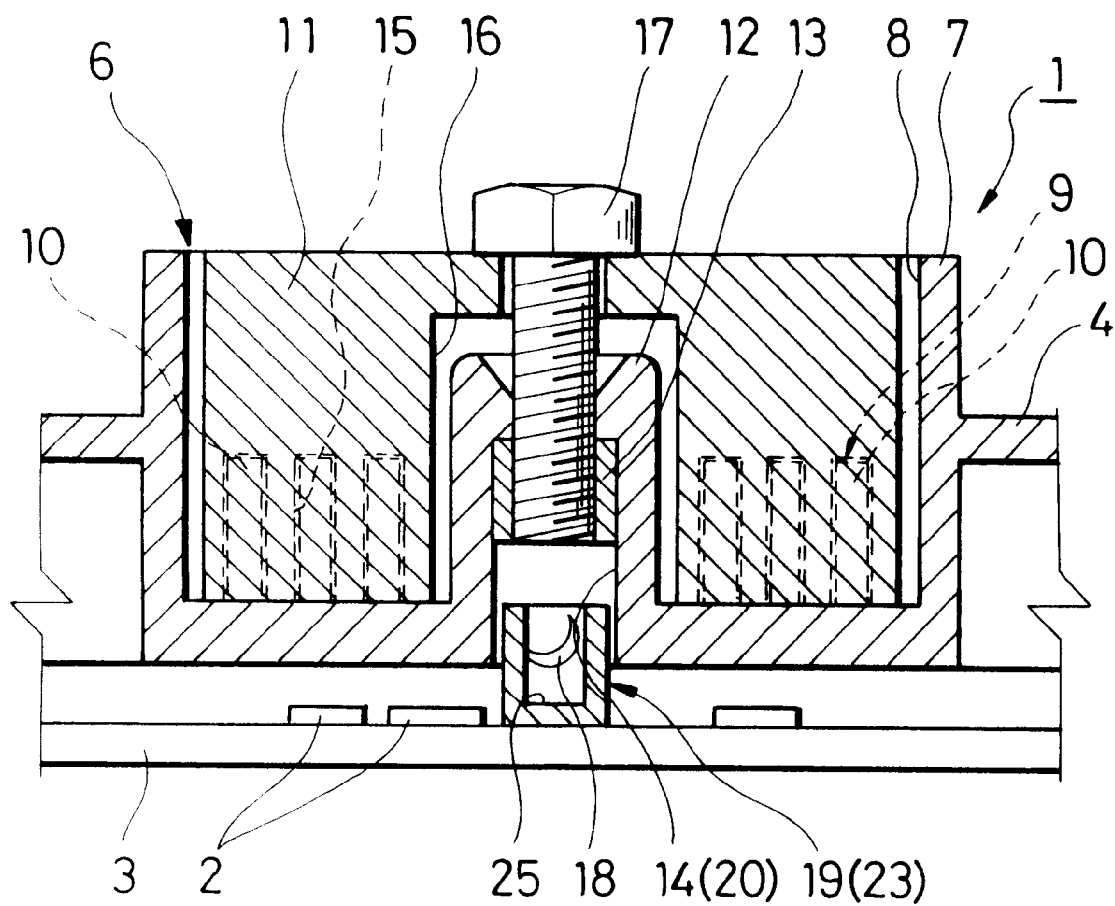
FIG. 2 is a sectional view showing the engagement of a multi-pole connector in the electrical junction box shown in FIG. 1.

In FIGS. 1 and 2, reference numeral 1 designates an example of an electrical junction box, which constitutes a first embodiment of the invention. The electrical junction box 1 comprises an upper cover 4, a lower cover 5, and a circuit board 3 which is interposed between those covers 4 and 5. The circuit board 3 is made of an electrical insulating material, and has a plurality of bus bars 2 which are to be connected to a relay, a fusible link, etc. which are provided on the electrical junction box 1. That is, the electrical junction box 1 can be assembled by combining the upper cover 4 and the lower cover 5 with the circuit board 3 interposed between those covers 4 and 5.

A female connector 9 having a connector inserting section 6 is provided in the upper cover 4 at a suitable position. The connector inserting section 6 has an opening 8 surrounded by a frame 7. In the opening 8, male terminals 10 are protruded.

A male multi-pole connector 11 is to be detachably fitted in the connector inserting section 6. A nut support 12 is provided at the center of the opening 8 of the connector inserting section 6, and a nut 13 is built in the nut support 12. A cylindrical hollow 14 is formed in the nut support 12.

The aforementioned male multi-pole connector 11 has female terminals 15 into which the male terminals 10 are to be inserted, and has a receiving recess 16 at the center which is extended along the central axis of the male multi-pole connector 11 and is adapted to receive the nut support 12. The receiving recess 16 supports a bolt 17 at the middle.

A receiving pan (plate) 23 forming a scraping-scattering preventing section 19 is provided on the upper surface of the circuit board 3 at a suitable position. The section 19 is to receive metal particles (scrapings) 18 which are scraped off the nut 13 supported by the nut support 12 or the bolt 17 to be engaged with the nut 13 when the bolt 17 is threadably engaged with the nut 13, thereby to prevent the metal particles (scrapings) from dropping on the circuit board 3.

Figure 3:
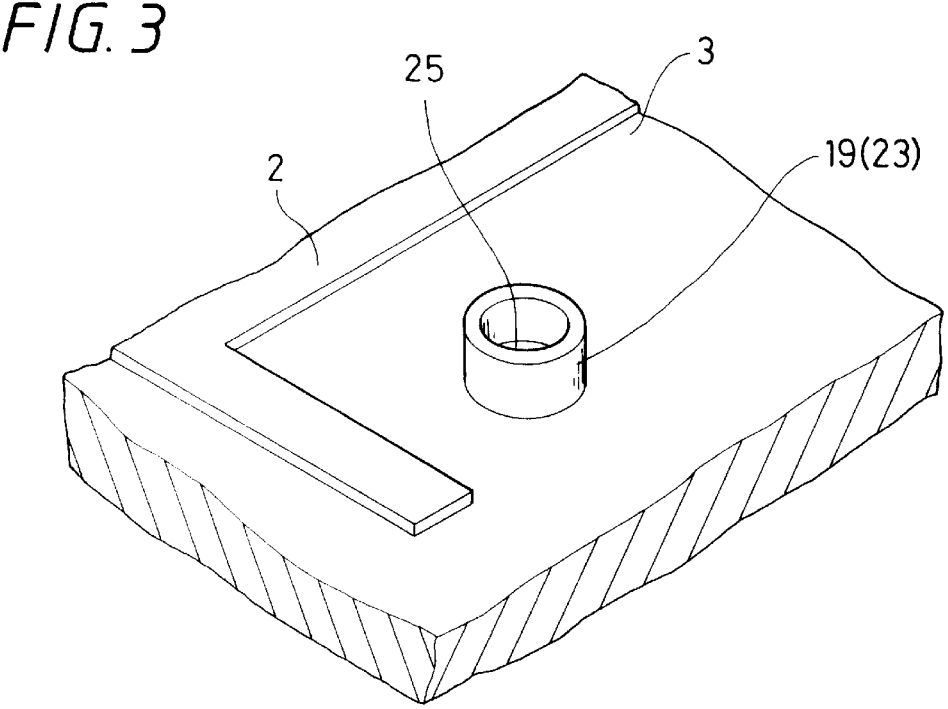
FIG. 3 is an enlarged perspective view, with parts cut away, showing a scraping-scattering preventing section in the electrical junction box shown in FIG. 1.

As shown in FIG. 3, the receiving pan 23 is cylindrical, and has a recess 25 in the top surface which is to receive metal particles (scrapings) 18 scraped off the nut or bolt. The receiving pan 23 is to be inserted into the cylindrical hollow 14 of the nut support 12.

The electrical junction box of the first embodiment is designed as described above. Therefore, the male connector 11 is inserted into the connector inserting section 6 formed on the upper cover 4, and the bolt 17 supported by the male connector 11 is threadably engaged with the nut 13 supported by the nut support 12 which is provided in the connector inserting section 6, thus fitting the male connector 11 in the connector inserting section 6.

Even if, in this operation, the metal scrapings 18 are dropped from the bolt 17 or the nut 13, no trouble is caused thereby. That is, the receiving pan 23 of the scraping-scattering preventing section 19 formed on the circuit board 3 is inserted into the cylindrical hollow 14 of the nut support 12. The receiving pan 23 has the recess 25 for receiving such metal scrapings 18. Hence, the metal scrapings 18 are completely received in the recess 25, which eliminates the occurrence of a trouble that the metal scrapings 18 drops on the circuit board 3 to short-circuit the board 3. In addition, the cylindrical hollow 14 of the connector inserting section 6, and the receiving pan 23 of the scraping-scattering preventing section 19 are high in the accuracy of engagement, which positively prevents the oscillation of the circuit board 3.

Now, another example of the electrical junction box, which constitutes a second embodiment of the invention, will be described with reference to FIGS. 4 and 5. In the second embodiment, the detailed descriptions of parts corresponding functionally to those already described with reference to the first embodiment are therefore omitted.

Figure 4:
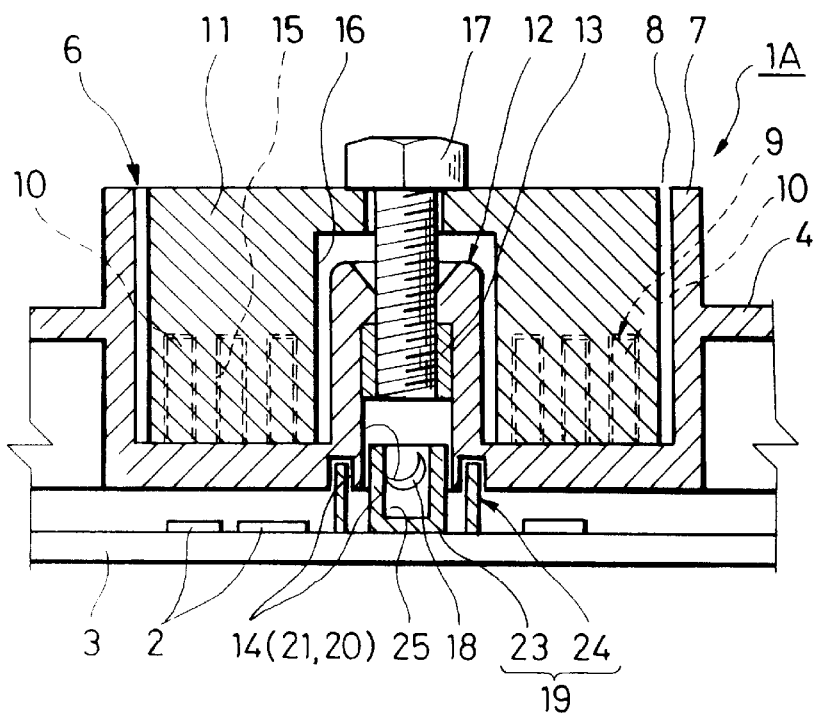
FIG. 4 is a sectional view for a description of another example of the electrical junction box, which constitutes a second embodiment of the invention.
Figure 5:
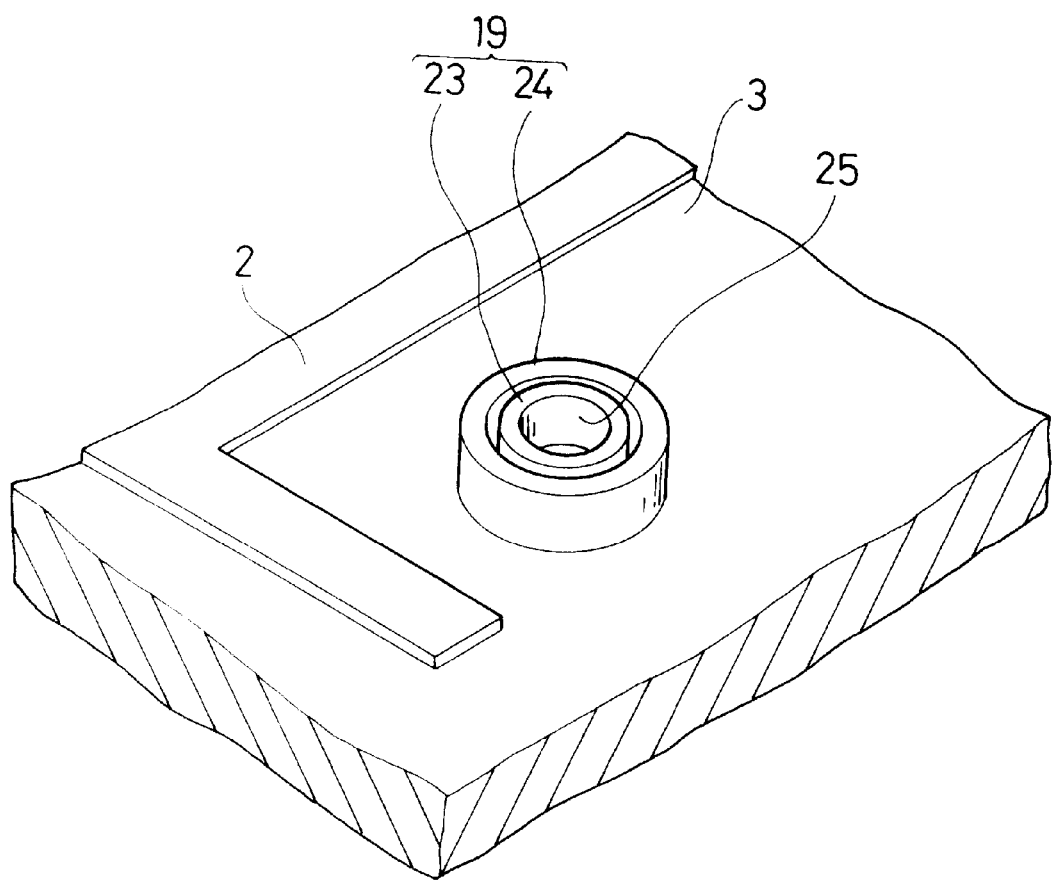
FIG. 5 is an enlarged perspective view, with parts cut away, showing a scraping-scattering preventing section in the electrical junction box shown in FIG. 4.
Figure 6:
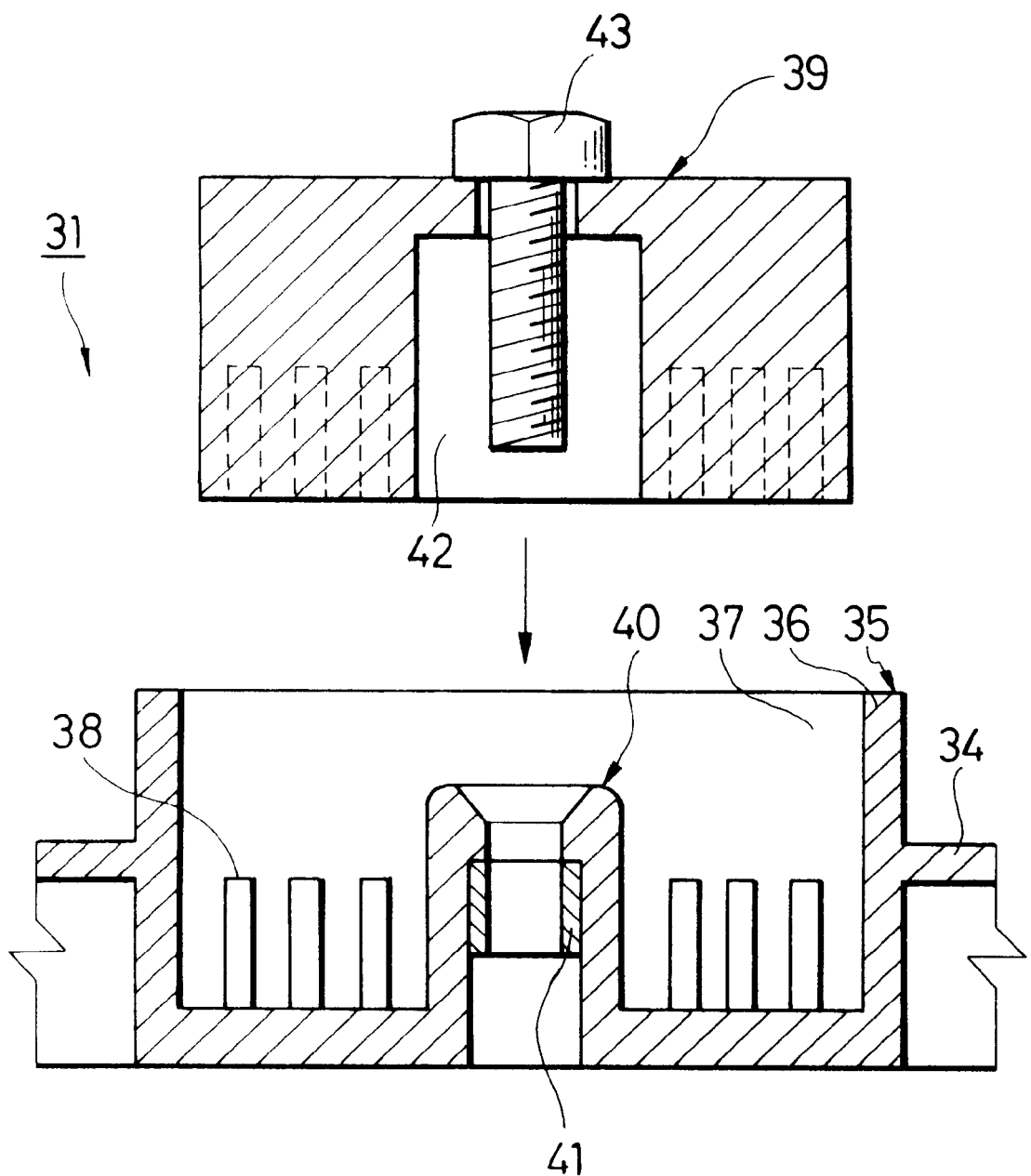
FIG. 6 is a sectional view showing a conventional electrical junction box.
Figure 7:
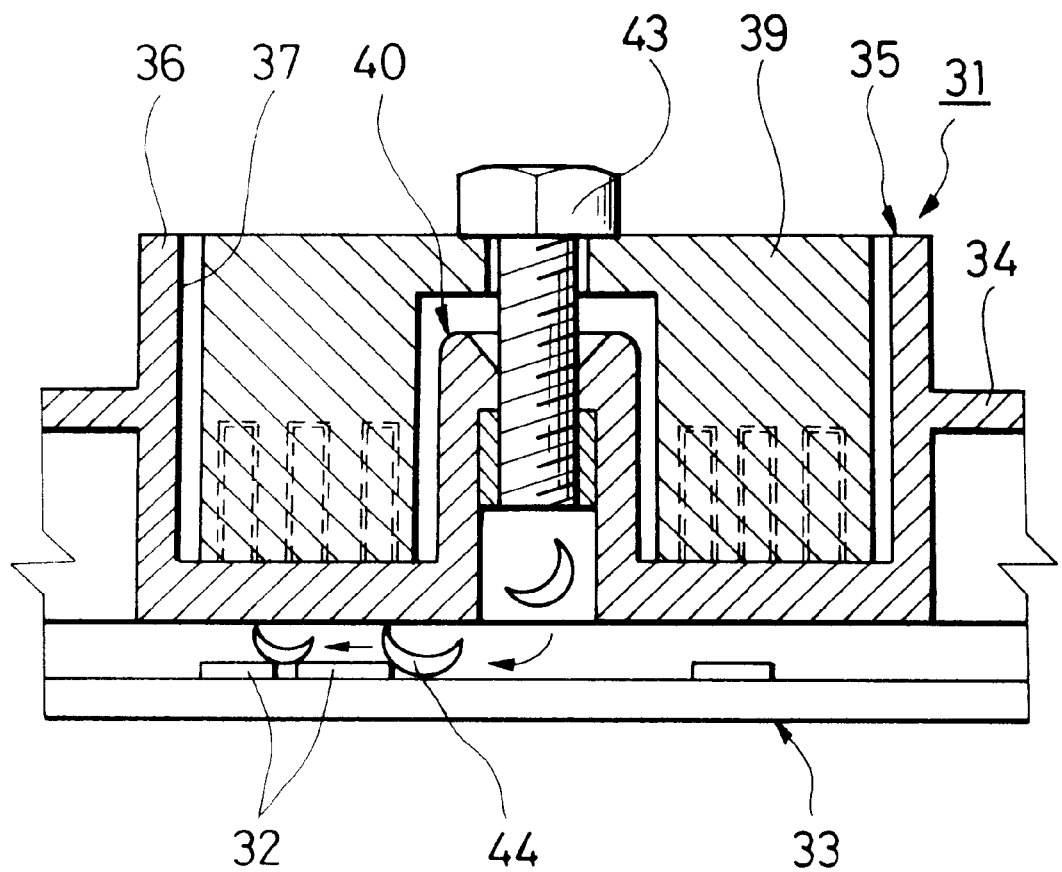
FIG. 7 is a sectional view showing the engagement of a multi-pole connector in the electrical junction box shown in FIG. 6.

In FIGS. 4 and 5, reference character 1A designates the electrical junction box of the second embodiment. A receiving pan 23, and an annular preventing wall 24 are formed on a circuit board 3 at a suitable position in such a manner that the annular preventing wall 24 surrounds the receiving pan 23. The receiving pan 23 and the annular preventing wall 24 form a scraping-scattering preventing section 19 which receives metal particles (scrapings) 18 which may be formed when a bolt 17 is threadably engaged with a nut 13 supported by a nut support 12. The receiving pan 23 has a recess 25 on the top which receives the scrapings 18, and it is inserted into a first hollow 20 of a cylindrical hollow 14 of the nut support 12.

An annular a second hollow 21, which is coaxial with the cylindrical hollow 14 and whose diameter is larger than the inside diameter of the cylindrical hollow 14, is formed around the first hollow 20 of the nut support 12. The aforementioned annular preventing wall 24 on the circuit board 3 is to be inserted into the second hollow 21.

The electrical junction box of the second embodiment is designed as described above. Hence, even if the metal particles (scrapings) 18 are formed and dropped when the bolt 17 of the male connector 11 is threadably engaged with the nut 13, the metal particles are received by the receiving pan 23 of the scraping-scattering preventing section 19 which is inserted into the cylindrical hollow 14. That is, the difficulty is completely prevented that scrapings 18 drop on the circuit board 3 to short-circuit the board 3.

The annular preventing wall 24 of the scraping-scattering preventing section 19 on the circuit board 3 is inserted into the second hollow 21; that is, the annular preventing wall 24 is inserted into the second hollow 21 with high accuracy. This feature positively prevents the oscillation of the circuit board 3.

As was described above, in the electrical junction box of the first embodiment, the scraping-scattering preventing section is formed on the circuit board which is inserted into the cylindrical hollow formed below the nut support, and is adapted to receive metal scrapings which may be formed when the bolt is engaged with the nut.

Hence, even if metal scrapings are formed when the multi-pole connector is fitted in the upper cover; that is, when the bolt is engaged with the nut, they drop in the receiving pan of the scraping-scattering preventing section formed on the circuit board. Hence, the difficulty is positively prevented that the metal scrapings drop on the circuit board to short-circuit the bus bars, accordingly the circuit or circuits. In addition, the oscillation of the circuit board is prevented by the simple structure.

Furthermore, one of the difficulties accompanying the conventional electrical junction box is eliminated that, in order to prevent the metal scrapings from short-circuiting the bus bars it is not permitted to arrange the bus bars right below of the bolt (or the nut), or near it. This means that the arrangement of the circuit is improved in the degree of freedom.

Moreover, in the electrical junction box of the first embodiment, the receiving pan of the scraping-scattering preventing section formed on the circuit board is inserted into the cylindrical hollow. This feature positively prevents the oscillation of the circuit board with the simple structure, and reduces the number of components of the electrical junction box.

In addition, in the electrical junction box of the second embodiment, the cylindrical hollow includes a small-diameter section and an annular hollow surrounding the small-diameter section, and the scraping-scattering preventing section includes an annular preventing wall which is inserted into the annular hollow, and a receiving pan which is inserted into the small-diameter section.

Hence, even if the bolt or the nut form metal scrapings, the scrapings drop in the receiving pan inserted into the small-diameter section and accommodated thereby. Accordingly, the difficulty is positively eliminated that the metal scrapings drop on the circuit board to short-circuit the bus bars on the board. On the other hand, the annular preventing wall is fitted in the annular hollow, so that the engagement therebetween is achieved with high accuracy, which prevents the oscillation of the circuit board in the electrical junction box.

What is claimed is:

1. An electrical junction box comprising:

a circuit board having a plurality of bus bars;

an upper cover which covers one surface of said circuit board;

a lower cover which covers the other surface of said circuit board;

a first connector which has a connector inserting section and is provided on said upper cover at a suitable position;

a nut support which supports a nut and is provided in the center of said first connector, so that a second connector, which is a mating connector, is fixedly fitted in said first connector with a bolt; and a scraping-scattering preventing section provided on said circuit board, said scraping-scattering preventing section being inserted into a cylindrical hollow formed below said nut support and being adapted to receive scrapings which may fall from said bolt or nut.

2. The electrical junction box as claimed in claim 1, wherein said scraping-scattering preventing section includes a cylindrical receiving pan.

3. The electrical junction box as claimed in claim 1, wherein said cylindrical hollow includes a first hollow and a second hollow which is annular and surrounding said first hollow, and said scraping-scattering preventing section includes an annular preventing wall which is inserted into said second hollow and a cylindrical receiving pan which is inserted into said first hollow.

* * * * *